US009331914B2

(12) United States Patent
Thyni et al.

(10) Patent No.: US 9,331,914 B2
(45) Date of Patent: May 3, 2016

(54) SERVICE SPECIFIC BANDWIDTH POLICY CONFIGURATION IN DATA NETWORKS

(75) Inventors: Tomas Thyni, Jarfalla (SE); Mats Forsman, Ronninge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 897 days.

(21) Appl. No.: 13/203,024

(22) PCT Filed: Feb. 26, 2009

(86) PCT No.: PCT/SE2009/050215
§ 371 (c)(1),
(2), (4) Date: Aug. 24, 2011

(87) PCT Pub. No.: WO2010/098705
PCT Pub. Date: Sep. 2, 2010

(65) Prior Publication Data
US 2011/0307588 A1    Dec. 15, 2011

(51) Int. Cl.
G06F 15/177    (2006.01)
H04L 12/24     (2006.01)
(Continued)

(52) U.S. Cl.
CPC ........ H04L 41/5054 (2013.01); H04L 12/2869 (2013.01); H04L 12/2876 (2013.01); H04L 12/5695 (2013.01); H04L 41/0893 (2013.01); H04L 47/724 (2013.01); H04L 47/781 (2013.01); H04L 67/16 (2013.01)

(58) Field of Classification Search
CPC . H04L 41/12; H04L 61/1511; H04L 41/0893; H04L 49/70; H04L 29/06; H04L 61/2061; H04L 12/28; G06F 9/5061; G06F 11/1464

USPC .......................................... 709/222
See application file for complete search history.

(56) References Cited

U.S. PATENT DOCUMENTS 6,046,980 A * 4/2000 Packer .......................... 370/230
6,553,568 B1 * 4/2003 Fijolek et al. ................. 725/111
(Continued)

FOREIGN PATENT DOCUMENTS

EP      1304831 B1 *  4/2007
WO    2006085233 A2    8/2006
(Continued)

OTHER PUBLICATIONS

Charles M. Kozierok, DHCP Lease Allocation Process, Sep. 20, 2005, http://www.tcpipguide.com/, Version 3.0, All Pages.*
(Continued)

Primary Examiner — Douglas Blair
Assistant Examiner — Imran Moorad
(74) Attorney, Agent, or Firm — Patent Portfolio Builders, PLLC

(57) ABSTRACT

The present invention relates to methods and arrangements for service specific bandwidth policy configuration in a data network (100) comprising a service management server (150), an access node (120) and an intermediate node (130, 140). The methods of the present invention comprise the steps of receiving a message comprising a service configuration for a client device connected to the data network and information regarding the bandwidth policy of the service configuration from the service management server (150). A service according to the information regarding the bandwidth policy of the service configuration is configured in the access node (120) and the intermediate node (130, 140), respectively.

38 Claims, 8 Drawing Sheets

(51) Int. Cl.
*H04L 12/28* (2006.01)
*H04L 12/54* (2013.01)
*H04L 12/913* (2013.01)
*H04L 12/911* (2013.01)
*H04L 29/08* (2006.01)

(56) References Cited

U.S. PATENT DOCUMENTS

| | | | |
|---|---|---|---|
| 6,876,667 B1* | 4/2005 | Synnestvedt et al. | 370/466 |
| 7,337,224 B1 | 2/2008 | Van Horne, III et al. | |
| 8,375,109 B1* | 2/2013 | Lange | H04L 61/2053 709/221 |
| 8,416,691 B1* | 4/2013 | Haberman et al. | 370/235 |
| 2002/0065907 A1* | 5/2002 | Cloonan et al. | 709/223 |
| 2002/0093936 A1* | 7/2002 | Chuah | 370/349 |
| 2005/0147035 A1 | 7/2005 | Sylvain et al. | |
| 2005/0163128 A1* | 7/2005 | Blackburn | H04L 12/2856 370/395.21 |
| 2009/0116380 A1* | 5/2009 | Santiago et al. | 370/229 |
| 2010/0094989 A1* | 4/2010 | Li | H04N 21/2385 709/224 |

FOREIGN PATENT DOCUMENTS

| | | |
|---|---|---|
| WO | 2007125430 A2 | 11/2007 |
| WO | 2008107625 A1 | 9/2008 |
| WO | 2009078765 A1 | 6/2009 |

OTHER PUBLICATIONS

Ralph Droms. "Dynamic Host Configuration Protocol", Network Working Group, document RFC 2131, Mar. 1997, pp. 1-45.
Steve Alexander et al., "DHCP Options and BOOTP Vendor Extensions", Network Working Group, document RFC 2132, Mar. 1997, pp. 1-30.
Michael Patrick, "DHCP Relay Agent Information Option", Network Working Group, document RFC 3046, Jan. 2001, pp. 1-14.
Ralph Droms, et al., " Dynamic Host Configuration Protocol for IPv6 (DHCPv6)", Network Working Group, document RFC 3315, Jul. 2003, pp. 1-89.
Mark Stapp et al., "Vendor-Specific Information Suboption for the Dynamic Host Configuration Protocol (DHCP) Relay Agent Option", Network Working Group, document RFC 4243, Dec. 2005, pp. 1-13.
Bernard Volz, "Dynamic Host Configuration Protocol for IPv6 (DHCPv6) Relay Agent Subscriber-ID Option", Network Working Group, document RFC 4580, Jun. 2006, pp. 1-6.
Bernard Volz, "Dynamic Host Configuration Protocol for IPv6 (DHCPv6) Relay Agent Remote-ID Option", Network Working Group, document RFC 4649, Aug. 2006, pp. 1-6.
Shengyou Zeng, et al., "DHCPv6 Relay Agent Echo Request Option", Network Working Group, document RFC 4994, Sep. 2007, pp. 1-6.
Supplemental European Search Report Application No. EP09840894.1, Mar. 31, 2015, 9 pgs.

* cited by examiner

SERVICE SPECIFIC BANDWIDTH POLICY CONFIGURATION IN DATA NETWORKS

CROSS-REFERENCE TO RELATED APPLICATION

This application is a 35 U.S.C. §371 National Phase Entry Application from PCT/SE2009/050215, filed Feb. 26, 2009, and designating the United States, the disclosure of which is incorporated by reference herein in its entirety.

TECHNICAL FIELD

The present invention relates to the area of data communication, and especially to methods and arrangements in a data network. More specifically it relates to methods and arrangements for service configuration in a data network.

BACKGROUND

Computer networks of today offer a wide range of services delivered by several service providers. The service provider offers data communication means to clients in the service provider's own network as well as access to the Internet via their own network. The product that the service provider sells is bandwidth internally within the own network and bandwidth out to the Internet. There is a major interest in Internet and data communications today leading to higher demands for bandwidth within the service provider's network as well as out to the Internet. This leads to a demand from the service providers of the computer networks for methods and equipments that make it possible to offer tailored services to their clients, thus enabling optimized utilization of the network. Further the service providers want the methods and equipments to provide good control and monitoring means such that the service provider can make sure that the offered quality for a particular type of service is fulfilled by means of sufficient bandwidth being provided.

In computer networks, data is transmitted in data packets. The type of data network of the service provider may vary. Examples of different types of data networks are Ethernet, Token Ring, Dynamic synchronous Transfer Mode (DTM), Asynchronous Transfer Mode (ATM) and (POS) Packet over Synchronous optical networking (SONET)/Synchronous Digital Hierarchy (SDH). The data network of the service provider can be connected to the Internet by means of at least one gateway/router which functions as a boarder gateway between the Internet and the data network of the service provider. The gateway/router is adapted to exchange routing data between different types of protocols. Internet is based on the protocol suite called Internet Protocol (IP). The data network of the service provider is also based on IP. Data packets which originate from the data network of the service provider and are to be transmitted out on the global Internet must be routed to the destination IP based on routing information obtained via a routing protocol.

The data network of the service provider typically further comprise routers routing the data packets within the data network and access nodes at the periphery of the data network adapted to connect client devices to the data network. Examples of client devices are a Voice over IP (VoIP) phone, a game consol, a set-top-box (STB), a network radio or a computer (PC). The client devices are connected to the access nodes via client interfaces, such as e.g. fiber converters, modems such as Asymmetric Digital Subscriber Line (ADSL) modems, Home Gateways, Optical Line Termination (OLT), Ethernet Switches, Routers, etc. The client interface is typically also built into the client device, such as an Ethernet interface or a modem inside a computer. In the case of a home or business local network with several client devices, it is common for the local network to use a single point of connection, i.e. only one client interface, such as e.g. a Customer Premises Equipment (CPE) or a Residential Gateway (RG). I.e. several different client devices are connected to the access node of the service provider's data network via only one client interface.

As mentioned above, each client interface can have several different client devices, enabling different services, connected to the service provider's data network. These different services, enabled by the different client devices often have different requirements regarding network Quality of Service (QoS), such as e.g. different requirements regarding performance, tolerance to packet loss, low latency, delay variation and/or bandwidth. The data networks of today are built to support multiple services requiring different levels of Quality of Service (QoS). Many different approaches to obtain QoS are used, such as Resource ReSerVation Protocol (RSVP) which is used by routers to request and/or deliver specific levels of QoS for application data streams or flows. Other examples are Integrated Services (IntServ) and Differentiated Services (DiffServ). IntServ explicitly manages the network resources to provide QoS to specific user packet streams/flows in networks. DiffServ first categorizes the data traffic into a standardized set of traffic classes, such as e.g. the Class of Service (CoS). The data of the traffic classes is thereafter treated differently to differentiate service. For example, each traffic class may be subject to a different rate limit, shaped separately and/or prioritized relative to other traffic classes.

A way of achieving QoS is to use the Dynamic Host Configuration Protocol (DHCP). DHCP is a protocol used by networked devices such as client devices to obtain various parameters, such as Internet Protocol (IP) address, necessary for the networked client devices to operate in an IP network. A DHCP server manages a pool of IP addresses and information about client configuration parameters such as e.g. the "default gateway". The "default gateway" is the network node of a data network that serves as the exit point to other networks. According to the DHCP dynamic allocation mode for allocating IP addresses each DHCP client in a data network is configured to request an IP address from the DHCP server during network initialization. This is a request-and-grant process which uses a lease concept with a controllable time period which means that the requested and granted IP address is only valid during a specified time period, thus allowing the DHCP server to reclaim (and then reallocate) IP addresses that are not renewed, i.e. dynamic re-use of IP addresses. The DHCP concept also includes DHCP forwarders and DHCP intermediate agents adapted to propagate the broadcast DHCP message across the router interfaces, without any special processing and DHCP Relay Agents, which relays DHCP messages between DHCP clients and DHCP servers wherein the DHCP clients and DHCP servers may be located on different IP networks. The DHCP Relay agent intercepts the DHCP messages and makes changes to the DHCP Message, such as forwarding the DHCP Message via a directed datagram to a specific DHCP Server, such as e.g. to the DHCP server dedicated to the subnet wherein the DHCP client who sent the DHCP message is located. The DHCP Relay Agent is configured with addresses of DHCP Servers to which they should relay the DHCP Messages.

The existing technologies for setting up service policy for a client device are limited to a single node in the network such as a Broadband Network Gateway (BNG) or a Broadband Access Server (BRAS). That is the only node in the network which knows how to handle the specific traffic to and from a client device according to the service policy. However, when the traffic to or from the client device reaches the node the traffic has already loaded other parts of the network with traffic that may be dropped by the service policy enforcement function in the node. This problem is accentuated for applications using User Datagram Protocol (UDP) instead of Transmission Control Protocol (TCP) because UDP will keep on sending traffic as fast as possible even though packets are dropped. The TCP has a built in back-off function which kicks in when packets starting to be dropped between the communicating end-points.

Accordingly, there is a need for an improved handling of the specific traffic to and from a client device in a data network.

SUMMARY

It is therefore an object of the present invention to improve network performance in a data network.

The object is achieved by establishing a service specific bandwidth policy configuration in a data network.

The object is achieved according to the present invention by methods and arrangements for establishing a service specific bandwidth policy configuration in a data network.

In accordance with a first aspect of the invention the object is achieved by a method for establishing a service specific bandwidth policy configuration in an intermediate node. The intermediate node is comprised in a data network and is connected to a service management server and an access node comprised in the data network. The intermediate node is further connected to a client device. The method comprises the step of receiving a message addressed to the client device from the service management server. The message comprises a service configuration for the client device and information regarding the bandwidth policy of the service configuration. The method further comprises the steps of configuring a service according to the information regarding the bandwidth policy of the service configuration and forwarding the received message to the access node.

In accordance with a second aspect of the present invention the object is achieved by an intermediate node for establishing a service specific bandwidth policy configuration. The intermediate node is arranged to be comprised in a data network. The intermediate node is adapted to be connected to a service management server and an access node arranged to be comprised in the data network. The intermediate node is further adapted to be connected to a client device. The intermediate node comprises a receiver adapted to receive a message addressed to the client device from the service management server. The message comprises a service configuration for the client device and information regarding the bandwidth policy of the service configuration. Furthermore, the intermediate node comprises a configuring unit adapted to configure a service according to the information regarding the bandwidth policy of the service configuration and a transmitter adapted to forward the received message to the access node.

In accordance with a third aspect of the invention the object is achieved by a method for establishing a service specific bandwidth policy configuration in an access node. The access node is comprised in a data network and is connected to a service management server and an intermediate node comprised in the data network. The access node is further connected to a client device. The method comprises the step of receiving a message addressed to the client device from the service management server. The message comprises information regarding a service configuration for the client device and information regarding bandwidth policy of the service configuration. The method further comprises the step of configuring a service according to the information regarding the bandwidth policy of the service configuration, removing information regarding the bandwidth policy of the service configuration from the message and forwarding the message to the client device.

In accordance with a fourth aspect of the present invention the object is achieved by an access node for establishing a service specific bandwidth policy configuration. The access node is arranged to be comprised in a data network. The access node is adapted to be connected to a service management server and an intermediate node arranged to be comprised in the data network. The access node is further arranged to be connected to a client device. The access node comprises a receiver adapted to receive a message addressed to the client device from the service management server. The message comprises information regarding a service configuration for the client device and information regarding bandwidth policy of the service configuration. The access node comprises a configuring unit adapted to configure a service according to the information regarding the bandwidth policy of the service configuration and a removing unit adapted to remove information regarding the bandwidth policy of the service configuration from the message. Furthermore, the access node comprises a transmitter adapted to forward the message to the client device.

In accordance with a fifth aspect of the invention the object is achieved by a method for establishing a service specific bandwidth policy configuration in a service management server. The service management server is comprised in a data network and is connected to an access node and an intermediate node comprised in the data network. The service management server is further connected to a client device. The method comprises the step of receiving a request message from the client device. The request message comprises a service configuration request. The method further comprises the steps of performing a binding of the requested service configuration for the client device, said binding comprising the setting of a bandwidth policy, and sending a message addressed to the client device. The message comprises information regarding the bounded service configuration and information regarding the bandwidth policy of the bounded service configuration.

In accordance with a sixth aspect of the present invention the object is achieved by a service management server for establishing a service specific bandwidth policy configuration. The service management server is arranged to be comprised in a data network. The service management server is adapted to be connected to an access node and an intermediate node arranged to be comprised in the data network. The service management server is further arranged to be connected to a client device. The service management server comprises a receiver adapted to receive a request message from the client device. The request message comprises a service configuration request. The service management server further comprises a binding unit adapted to perform a binding of the requested service configuration for the client device, said binding comprising the setting of a bandwidth policy and a transmitter adapted to send a message addressed to the client device, the message comprises information regarding the bounded service configuration and information regarding the bandwidth policy of the bounded service configuration.

An advantage of the present invention is that the methods and network nodes according to the present solution enables an dynamic and lightweight way of conveying service policy enforcements parameters dynamically to multiple nodes, such as intermediate nodes, access nodes, switches and routers, to achieve better network policy enforcements. This is very important in networks with multiple services per client device and/or client interface/CPE wherein the multiple services require different levels of network QoS and/or CoS and different levels of bandwidth enforcements, and are connected via different types of access technologies.

A further advantage of the present invention is that the methods and network nodes according to the present solution enables an efficient use of the capacity of the data network.

BRIEF DESCRIPTION OF THE DRAWINGS

For a better understanding, reference is made to the following drawings and preferred embodiments of the invention.

DETAILED DESCRIPTION

Figure 1:
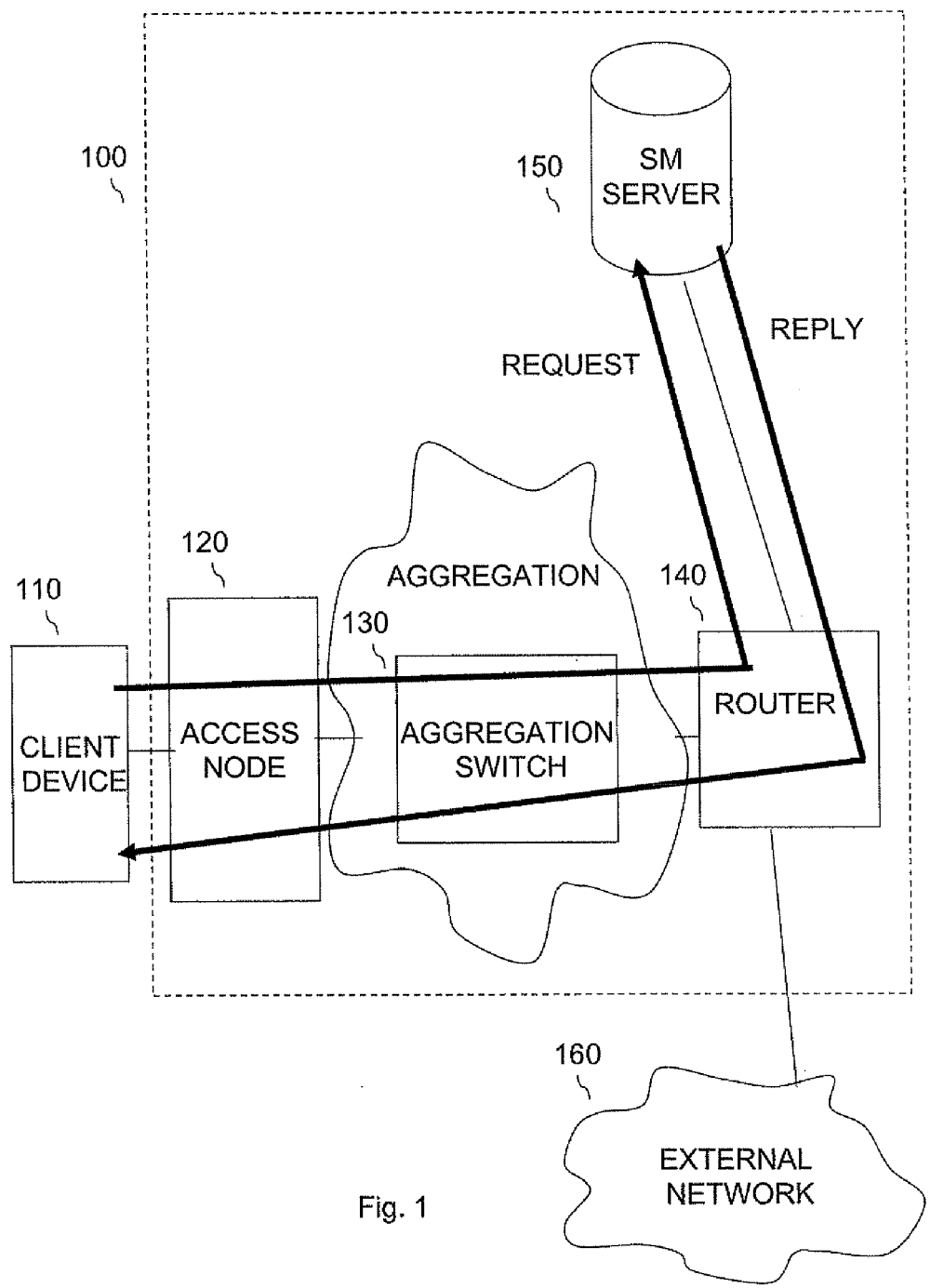
FIG. 1 illustrates schematically a data network wherein the present invention may be implemented.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention relates to methods and arrangements for establishing a service specific bandwidth policy configuration in a data network. In one embodiment of the present invention a service management server comprised in the data network receives a request message comprising a service configuration request from a client device. The service management performs a binding of the requested service configuration. The binding comprises the setting of a bandwidth policy of the service configuration. Furthermore, the service management server sends a message addressed to the client device. The message comprises information regarding the bounded service configuration and the bandwidth policy of the bounded service configuration. By supplying the bandwidth policy information in the message, the individual traffic nodes in the data network can snoop the bandwidth policy information and enforce the bandwidth policy information in the node. In one embodiment of the present invention an intermediate node comprised in the data network such as a router or a switch, receives the message addressed to the client device and configures a service according to the bandwidth policy information. Thereupon, the intermediate node forwards the message to an access node. In one embodiment of the present invention an access node comprised in the data network receives the message addressed to the client device and configures a service according to the bandwidth policy information. Thereupon, the access node removes the information regarding the bandwidth policy from the message and forwards the message to the client device.

The bandwidth policy of a service configuration may comprise configuration parameters such as e.g. one or several traffic classes of the service configuration, amount of traffic allowed in the traffic class, the shaping or policing of the amount of traffic allowed, the asymmetric, i.e. up-stream/down-stream, of the bandwidth policy of the allowed amount of traffic, whether the bandwidth policy is client specific or a shared policy and the rate limiting hierarchy of the traffic classes.

Traffic shaping provides a means to control the amount of traffic being sent into the data network during a specified period. Traffic shaping is achieved by imposing additional delay to packets, e.g. buffer the packets, above the set traffic rate so the overall packet flow can conform to the set traffic rate. Traffic policing provides a means to control the amount of traffic being sent into the data network by packet dropping of packets above the set traffic rate.

In a client specific policy the traffic class, policing, and shaping etc. is a dedicated policy for the specific client i.e. one IP-address. This gives dedicated resources for a specific client, e.g. Client-1 and Client-2 on the same physical connection can have different bandwidth up-stream/down-stream for traffic in the same traffic class. As an example, if the physical connection allows for 100 Mbps symmetric:

Client-1: 10 Mbps down-stream/10 Mbps up-stream, policing for CoS=BE, dedicated Client-2: 30 Mbps down-stream/10 Mbps up-stream, policing for CoS=BE, dedicated In this case a total of 40 Mbps can be used in down-stream and 20 Mbps in upstream for BE (Best Effort) traffic, and each client can always use up to the limit of there specific policy.

In a shared policy the traffic class, policing, and shaping etc. is a shared policy for several clients i.e. several IP-addresses. This gives shared resources for multiple clients. As an example, if the physical connection allows for 100 Mbps symmetric:

Client-1: 10 Mbps down-stream/10 Mbps up-stream, policing for CoS=BE, shared Client-2: 30 Mbps down-stream/10 Mbps up-stream, policing for CoS=BE, shared In this case a total of 30 Mbps can be used in down-stream and 10 Mbps in upstream for BE traffic, and each client is limited to there specific policy. However, in the case they run traffic at the same time they will share the total of 30 Mbps down and 10 Mbps up. This provides the possibility to combine a shared and a dedicated bandwidth policy in order to give dedicated bandwidth to client devices and traffic classes requiring this, and share bandwidth between other client devices and traffic classes.

The rate limiting hierarchy describes the scheduling hierarchy of the traffic classes. A traffic class represents a priority and a traffic class of higher priority has priority over a traffic class of lower priority. Moreover, the traffic class with higher priority may use up to its rate limit whereas the traffic class with lower priority may use what bandwidth, i.e. rate, which is left over.

FIG. 1 presents an exemplary scenario of a data network 100 of a service provider comprising an access node 120, intermediate nodes such as an aggregation switch 130 and an edge router 140. Examples of different types of data networks are Ethernet, Token Ring, Dynamic synchronous Transfer Mode (DTM), Asynchronous Transfer Mode (ATM) and (POS). FIG. 1 shows only one access node 120, one switch 130 and one router 140, but these numbers may be considerably larger. The router 140 is adapted to route data packets between different types of networks and is thus adapted to connect the data network 100 to external networks and/or equipments 160 such as e.g. the Internet or other service provider networks, enabling connectivity to external services and networks. The data network 100 offers multiple services which may be implemented as multiple routers 140 interfacing the different services each placed in a different external network 160, such as e.g. IP subnets. A router 140 may interface one or several different external networks 160. Examples of routers 140 are Ethernet switches/routers or Multi Service Edge Router (MSER), Broadband Access Server (BRAS), Broadband Network Gateway (BNG) and Mobile-Access Gateway (Mobile-AGW). The switch 130 is adapted to switch the data packets within the data network 100. The access node 120 is adapted to connect client devices 110 to the data network 100. Examples of access nodes 120 are e.g. a Digital Subscriber Line Access Multiplexer (DSLAM) or a Passive Optical Networks Optical Line Termination (PON-OLT) and Ethernet switches.

The client device 110 is connected to the data network 100 via a client interface. The client device 110 may be e.g. a Voice over IP (VoIP) phone, a game consol or a computer, etc. Examples of client interfaces are e.g. a Residential Gateway (RG), a Passive Optical Networks Optical Network Termination (PON-ONT), a Third Generation (3G) home base station and a Digital Subscriber Line (xDSL) modem. The client interface may be internal or external to the client device 110. An example of an internal client interface is an Ethernet network interface or a modem inside a computer. An external client interface may be connected to several client devices 110, such as in the case of a local network client with several client devices. This means that several different client devices are connected to the access node of the service provider's data network via only one client interface. Examples of external client interfaces connecting several client devices 110 are e.g. a Customer Premises Equipment (CPE) or a Residential Gateway (RG).

The data network 100 further comprises a service management (SM) server 150, such as e.g. a DHCP server. The data network 100 may also comprise at least one second service management server. Each client device 110 and/or client interface may comprise a service management client, such as e.g. a DHCP client. The service management server 150 is adapted to communicate with the service management clients, e.g. using service management messages such as e.g. DHCP messages. Further may the access node 120 and the intermediate nodes 130, 140 of the network 100, such as e.g. switch 130, and edge router 140 comprise a service management agent, such as e.g. a DHCP relay agent, DHCP intermediate agent, or a DHCP forwarding agent. The service management agent is adapted to propagate and/or process the service management messages sent from the service management clients to the service management server 150 and vice versa. From now on the service management server 150, service management client and service management agent will be called SM server 150, SM client and SM agent respectively.

Figure 2:
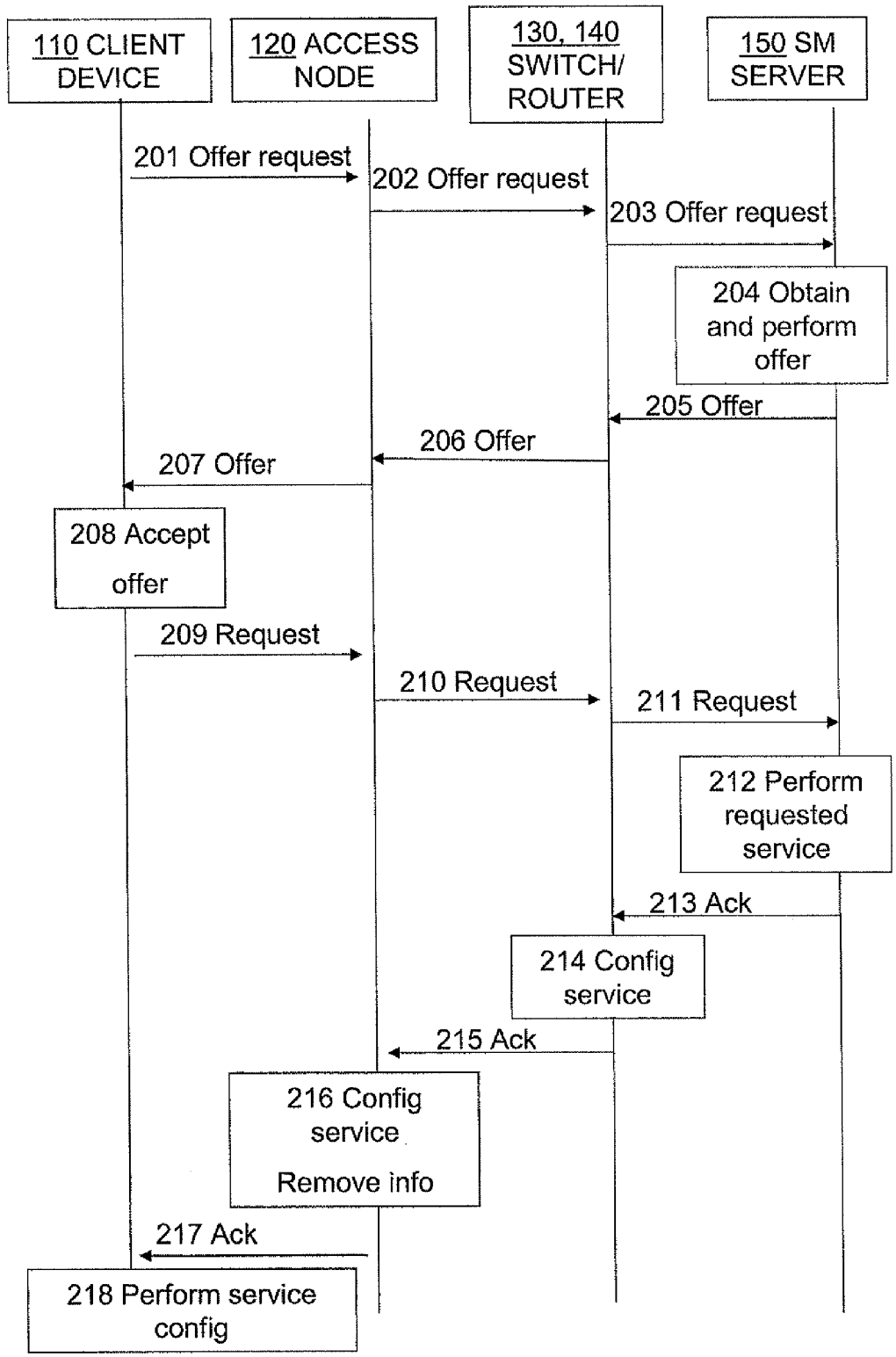
FIGS. 2 and 3 are combined flowchart and signalling schemes illustrating embodiments of the present invention.

FIG. 2 is a flowchart and signalling scheme presenting a schematic view of the steps performed according to embodiments wherein a service specific bandwidth policy configuration is established in a data network 100 during initialization of a requested service. The requested service may be e.g. a Voice over IP communication, Internet connectivity, media streaming etc. The schematic view of FIG. 2 corresponds to the embodiments wherein the configuration of a service in the access node 120 and in the intermediate node 130, 140 is performed in the final phase 209-218 of the service configuration process 201-218. FIG. 2 shows the client device 110 comprising the client interface, which may be internal or external to the client device 110. The client device 110 is adapted to be connected to a network 100 via an access node 120.

201. The client device 110 sends an offer request message, requesting service configuration information. This is performed to initiate the service. The requesting of the service configuration information is typically initiated immediately after booting when the client device 110 and/or client interface connects to the network 100, and the request may preferably be completed before the client device 110 and/or client interface performs the requested service.

According to embodiments wherein the client device 150 or the client interface comprises a SM client, this step may be performed by the SM client.

According to embodiments wherein the SM client is a DHCP client this step is performed using DHCP signaling. The offer request message may be a broadcast query such as e.g. a DHCP Discover. A DHCP Discover message requests necessary information from a DHCP server. The DHCP client may broadcast on the physical subnet to find available DHCP servers.

202. The access node 120 receives the offer request message from the client device 110 and forwards it to the intermediate node 130, 140.

According to some embodiments the access node 120 comprises a SM agent.

According to some embodiments the SM agent may be e.g. a DHCP relay agent or a DHCP forwarding agent or a DHCP intermediate agent. The SM agent may intercept the received broadcast DHCP Discover message and may perform processing to be adapted to forward the message as a direct addressed DHCP Discover message to the service management server 150 of the network 100. The processing may comprise making changes to the received DHCP Messages, such as changing broadcast message to a direct addressed message using stored address information for DHCP servers, or adding DHCP option information such as Relay Agent Information Option (option 82).

203. The intermediate node 130, 140 receives the offer request message originating from the client device 110 and forwards it to the SM server 150.

According to some embodiments the access node 120 comprises a SM agent.

According to some embodiments the SM agent may be e.g. a DHCP relay agent or a DHCP forwarding agent or a DHCP intermediate agent. The SM agent may intercept the received broadcast DHCP Discover message and may perform processing to be adapted to forward the message as a direct addressed DHCP Discover message to the service management server 150 of the network 100. The processing may comprise making changes to the received DHCP Messages, such as changing broadcast message to a direct addressed message using stored address information for DHCP servers, or adding DHCP option information such as Relay Agent Information Option (option 82).

204. The SM server 150 receives the offer request message originating from the client device 110. Upon receipt of a valid offer request message, the SM server 150 obtains an offer for a service configuration for the requested service configuration. The SM server 150 further makes a preliminary binding of the offered service configuration for the client device 110. The offered service configuration comprises service specific QoS configuration information. When the SM server 150 offers a service configuration, such as e.g. an IP address, to the client device 110 the SM server 150 also offers at least one router 140 for the client device 110 to send its traffic to.

According to the embodiments wherein the SM server 150 is a DHCP server, the offer request may be obtained from the DHCP server internal pool of IP addresses and information. The offer for a service configuration may comprise configuration parameters such as e.g. the IP address that the DHCP server is offering the client device 110, the subnet mask, the lease duration (the length of time for which the allocation is valid), the default gateway, i.e. router 140 whereby the requested service is obtained and the IP address of the DHCP server making the offer. When the DHCP server provides an IP address to the client device 110, the DHCP server also may give out at least one router 140 for the client device 110 to send its traffic to using DHCP option 3. In data networks 100 offering multiple services it may also be possible to have multiple routers 140 for different services. DHCP can also be used to communicate these multiple routers 140 or external network 160 to the client device 110 using DHCP option 33 and/or DHCP option 121, or DHCPv6 route option. By extending the DHCP information with QoS parameters for the external networks 160 or specific IP addresses of the routers 140 that require certain QoS handling, the client device 110 can configure the correct QoS for the data traffic to give end-to-end QoS. In addition to the QoS information sent to the client device 110, there is additional bandwidth policy information related to the QoS sent as an additional option or as an extension to an existing option. This makes the QoS and the bandwidth policy configuration information service specific. The TCP/UDP destination port is also under the control of the network operator and requires no static configuration of client devices 110 and/or client interfaces.

205. Then the SM server 150 sends an offer message comprising an offer of the service specific configuration across the data network 100 addressed to the client device 110.

According to the embodiments wherein the SM server 150 is a DHCP server, the offer message may be a DHCP Offer message comprising the preliminary bound QoS configuration information.

206. The intermediate node 130, 140 receives and forwards the offer message, which offer message is addressed to the client device 110, to the access node 120.

207. The access node 120 receives and forwards the offer message, which offer message is addressed to the client device 110, to the client device 110.

208. The client device 110 receives the offer message. Furthermore, the client device 110 selects and accepts the offer that was comprised in the received offer message. The offer message comprised service specific QoS configuration information.

According to the embodiments wherein the client device 110 or the client interface comprises a SM client this step is performed by the SM client.

According to the embodiments wherein the SM client is a DHCP client then the DHCP client selects and accepts the offer message which may be a DHCP offer message.

209. The client device 110 sends a request message to the SM server 150. The request message comprises the IP address of the SM server 150, i.e. the IP address of the server that made the offer which was selected.

According to the embodiments wherein the client device 110 or client interface comprises a SM client then the SM client sends the request message to the SM server 150.

According to the embodiments wherein the SM client is a DHCP client then the DHCP client may send the request message which may be a DHCP Request message. Thus, the DHCP client sends the DHCP request message comprising the IP address of the DHCP server that made the offer.

210. The access node 120 receives and forwards the request message to the SM server 150.

According to some embodiments the access node 120 comprises an SM agent which may process the received request message.

The SM agent, such as e.g. a DHCP relay agent or a DHCP forwarding agent or a DHCP intermediate agent, may intercept the DHCP Request message. The DHCP relay agent may perform processing to be adapted to forward the message as a direct addressed DHCP Request message to the SM server 150.

211. The intermediate node 130, 140 receives and forwards the request message to the SM server 150.

According to some embodiments the intermediate node 130, 140 comprises an SM agent which may process the received request message.

The SM agent, such as e.g. a DHCP relay agent or a DHCP forwarding agent or a DHCP intermediate agent, may intercept the DHCP Request message. The DHCP relay agent may perform processing to be adapted to forward the message as a direct addressed DHCP Request message to the SM server 150.

212. Upon receipt of the request message originating from the client device 110 the SM server 150 makes a final binding of the requested offered service configuration for the client device 110. The requested offered service configuration comprises the service specific QoS configuration information. The binding of the requested offered service configuration comprises a setting of a bandwidth policy of the service configuration.

According to the embodiments wherein the SM server 150 is a DHCP server, the DHCP server makes the final binding of the requested offered service specific QoS service configuration for the SM client such as the DHCP client, of the client device 110. At this point, the IP and network QoS configuration process is complete. When the SM server 150 provides the service configuration, such as e.g. an IP address, to the client device 110 the SM server 150 also provides the bandwidth policy of the service configuration to the intermediate node 130, 140 and the access node 120.

According to the embodiments wherein the SM server 150 is a DHCP server, the bandwidth policy of the service configuration may be set in the DHCP server. The bandwidth policy of a service configuration may comprise configuration parameters such as e.g. one or several traffic classes of the service configuration, amount of traffic allowed in the traffic class, the shaping or policing of the amount of traffic allowed, the asymmetric, i.e. up-stream/down-stream, of the bandwidth policy of the allowed amount of traffic, whether the bandwidth policy is client specific or a shared policy and the rate limiting hierarchy of the traffic classes.

213. The SM server 150 sends an acknowledgement message comprising the information regarding the final bounded service configuration and the information regarding the bandwidth policy of the service configuration across the data network 100 to the client device 110.

According to the embodiments wherein the SM server 150 is a DHCP server then the acknowledgement message sent to the DHCP client may be a DHCP Acknowledgement message packet. The DHCP Acknowledgement message may comprise the DHCP option 82 extended to comprise the bandwidth policy information. In another embodiment, the DHCP Acknowledgement message may comprise a new option for bandwidth policy information.

214. The intermediate node 130, 140 receives the acknowledgement message addressed to the client device 110. The intermediate node 130, 140 configures a service according to the information regarding the bandwidth policy of the service configuration comprised in the acknowledgement message.

According to some embodiments the intermediate node, such as the switch 130 or the router 140, comprises an SM agent which may perform processing.

The SM agent, such as e.g. a DHCP relay agent or a DHCP forwarding agent or a DHCP intermediate agent, may intercept the DHCP messages and may perform processing, such as e.g. snooping and/or configuring/registering of the acknowledged service specific QoS service. This enables the intermediate node, such as the switch 130 or the router 140, to check that the service to be configured when performed is performed according to the acknowledged QoS. If not, i.e. the received data traffic from the client device 110 is of a QoS configuration other than the previously acknowledged, the intermediate node may adjust the service configuration to the acknowledged service specific QoS configuration.

The SM agent may intercept the DHCP messages and may perform processing, such as e.g. snooping and/or configuring of the bandwidth policy of the service configuration. This enables the intermediate node, such as the switch 130 or the router 140, to enforce the bandwidth policy of the service configuration at the intermediate node 130, 140. Thus, the intermediate node 130, 140 may configure a service according to the bandwidth policy of the service configuration.

215. The intermediate node 130, 140 forwards the received acknowledgement message comprising the information regarding the final bounded service configuration and the information regarding the bandwidth policy of the service configuration across the data network 100 to the client device 110.

216. The access node 120 receives the acknowledgement message addressed to the client device 110. The access node 120 configures a service according to the information regarding the bandwidth policy of the service configuration comprised in the acknowledgement message. The access node 120 removes information regarding the bandwidth policy of the service configuration from the acknowledgement message.

According to some embodiments the access node 120 comprises an SM agent which may perform processing.

The SM agent, such as e.g. a DHCP relay agent or a DHCP forwarding agent or a DHCP intermediate agent, may intercept the DHCP messages and may perform processing, such as e.g. snooping and/or configuring/registering of the acknowledged service specific QoS service. This enables the access node 120 to check that the service to be configured when performed is performed according to the acknowledged QoS. If not, i.e. the received data traffic from the client device 110 is of a QoS configuration other than the previously acknowledged, the access node may adjust the service configuration to the acknowledged service specific QoS configuration.

The SM agent may intercept the DHCP messages and may perform processing, such as e.g. snooping and/or configuring of the bandwidth policy of the service configuration. This enables the access node 120 to enforce the bandwidth policy of the service configuration at the access node 120. Thus, the access node 120 may configure a service according to the bandwidth policy of the service configuration.

The SM agent may remove the DHCP option 82 or the new option comprising the bandwidth policy information from the acknowledgement message addressed to the client device 110.

217. The access node 120 forwards the received acknowledgement message comprising the information regarding the final bounded service configuration across the data network 100 to the client device 110.

218. The client device 110 performs the service configuration according to the service configuration information in the received acknowledgement message.

Figure 3:
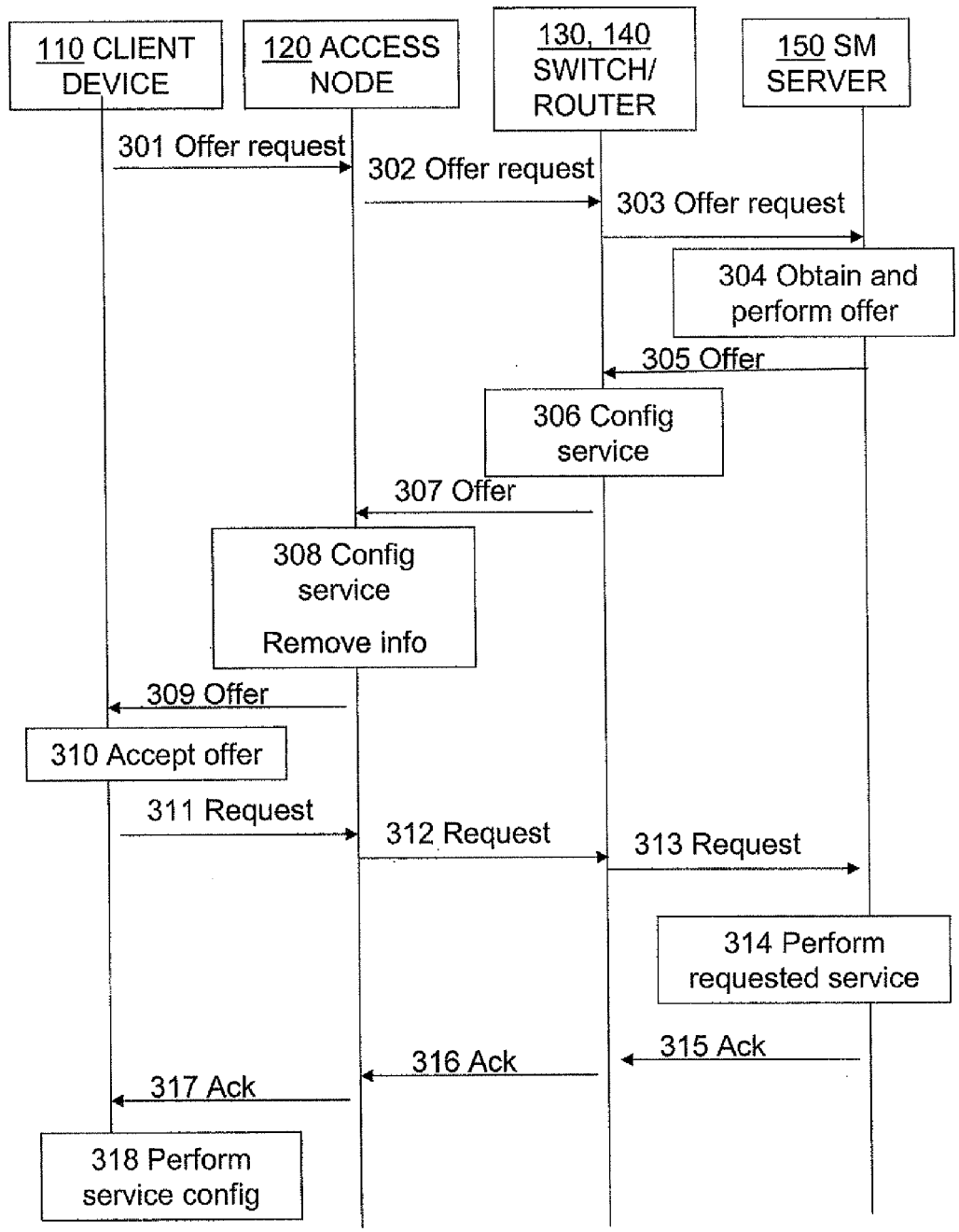

FIG. 3 is a flowchart and signalling scheme presenting a schematic view of the steps performed according to embodiments wherein a service specific bandwidth policy configuration is performed in a network 100 during initialization of a requested service. The requested service may be e.g. a Voice over IP communication, Internet connectivity, media streaming etc. The schematic view of FIG. 3 corresponds to the embodiments wherein the configuration of a service in the access node 120 and in the intermediate node 130, 140 is performed in the preliminary phase 301-318 of the service configuration process 301-318. FIG. 3 shows the client device 110 comprising the client interface, which may be internal or external to the client device 110. The client device 110 is adapted to be connected to a network 100 via an access node 120.

301. The client device 110 sends an offer request message, requesting service configuration information. This is performed to initiate the service. The requesting of the service configuration information is typically initiated immediately after booting when the client device 110 and/or client interface connects to the network 100, and the request may preferably be completed before the client device 110 and/or client interface performs the requested service.

According to embodiments wherein the client device 110 or the client interface comprises a SM client, this step may be performed by the SM client.

According to embodiments wherein the SM client is a DHCP client this step is performed using DHCP signaling. The offer request message may be a broadcast query such as e.g. a DHCP Discover. A DHCP Discover message requests necessary information from a DHCP server. The DHCP client may broadcast on the physical subnet to find available DHCP servers.

302. The access node 120 receives the offer request message from the client device 110 and forwards it to the intermediate node 130, 140.

According to some embodiments the access node 120 comprises a SM agent.

According to some embodiments the SM agent may be e.g. a DHCP relay agent or a DHCP forwarding agent or a DHCP intermediate agent. The SM agent may intercept the received broadcast DHCP Discover message and may perform processing to be adapted to forward the message as a direct addressed DHCP Discover message to the service management server 150 of the network 100. The processing may comprise making changes to the received DHCP Messages, such as changing broadcast message to a direct addressed message using stored address information for DHCP servers, or adding DHCP option information such as Relay Agent Information Option (option 82) or similar.

303. The intermediate node 130, 140 receives the offer request message originating from the client device 110 and forwards it to the SM server 150.

According to some embodiments the access node 120 comprises a SM agent.

According to some embodiments the SM agent may be e.g. a DHCP relay agent or a DHCP forwarding agent or a DHCP intermediate agent. The SM agent may intercept the received broadcast DHCP Discover message and may perform processing to be adapted to forward the message as a direct addressed DHCP Discover message to the service management server 150 of the network 100. The processing may comprise making changes to the received DHCP Messages, such as changing broadcast message to a direct addressed message using stored address information for DHCP servers, or adding DHCP option information such as Relay Agent Information Option (option 82).

304. The SM server 150 receives the offer request message originating from the client device 110. Upon receipt of a valid offer request message, the SM server 150 obtains an offer for a service configuration for the requested service configuration. The SM server 150 further makes a preliminary binding of the offered service configuration for the client device 110. The offered service configuration comprises service specific QoS configuration information. When the SM server 150 offers a service configuration, such as e.g. an IP address, to the client device 110 the SM server 150 also offers at least one router 140 for the client device 110 to send its traffic to. The preliminary binding of the requested offered service configuration comprises a setting of a bandwidth policy of the service configuration.

According to the embodiments wherein the SM server 150 is a DHCP server, the offer request may be obtained from the DHCP server internal pool of IP addresses and information. The offer for a service configuration may comprise configuration parameters such as e.g. the IP address that the DHCP server is offering the client device 110, the subnet mask, the lease duration (the length of time for which the allocation is valid), the default gateway, i.e. router 140 whereby the requested service is obtained and the IP address of the DHCP server making the offer. When the DHCP server provides an IP address to the client device 110, the DHCP server also may give out at least one router 140 for the client device 110 to send its traffic to using DHCP option 3. In data networks 100 offering multiple services it may also be possible to have multiple routers 140 for different services. DHCP can also be used to communicate these multiple routers 140 or external network 160 to the client device 110 using DHCP option 33 and/or DHCP option 121. By extending the DHCP information with QoS parameters for the external networks 160 or specific IP addresses of the routers 140 that require certain QoS handling, the client device 110 can configure the correct QoS for the data traffic to give end-to-end QoS. In addition to the QoS information sent to the client device 110, there is additional bandwidth policy information related to the QoS sent as an additional option or as an extension to an existing option. This makes the QoS and the bandwidth policy configuration information service specific.

According to the embodiments wherein the SM server 150 is a DHCP server, the bandwidth policy may be set in the DHCP server. The bandwidth policy of a service configuration may comprise configuration parameters such as e.g. one or several traffic classes of the service configuration, amount of traffic allowed in the traffic class, the shaping or policing of the amount of traffic allowed, the asymmetric, i.e. up-stream/down-stream, of the bandwidth policy of the allowed amount of traffic, whether the bandwidth policy is client specific or a shared policy and the rate limiting hierarchy of the traffic classes.

305. Then the SM server 150 sends an offer message comprising an offer of the service specific configuration and the information regarding the bandwidth policy of the service configuration across the data network 100 addressed to the client device 110.

According to the embodiments wherein the SM server 150 is a DHCP server, the offer message may be a DHCP Offer message comprising the preliminary bound service configuration information. The DHCP Offer message may comprise the DHCP option 82 extended to comprise the bandwidth policy information. In another embodiment, the DHCP Offer message may comprise a new option for bandwidth policy information.

306. The intermediate node 130, 140 receives the offer message addressed to the client device 110. The intermediate node 130, 140 configures a service according to the information regarding the bandwidth policy of the service configuration comprised in the offer message.

According to some embodiments the intermediate node, such as the switch 130 or the router 140, comprises an SM agent which may perform processing.

The SM agent may intercept the DHCP messages and may perform processing, such as e.g. snooping and/or configuring of the bandwidth policy of the service configuration. This enables the intermediate node, such as the switch 130 or the router 140, to enforce the bandwidth policy of the service configuration at the intermediate node 130, 140. Thus, the intermediate node 130, 140 may configure a service according to the bandwidth policy of the service configuration.

307. The intermediate node 130, 140 forwards the received offer message comprising the information regarding the preliminary bounded service configuration and the information regarding the bandwidth policy of the service configuration across the data network 100 to the client device 110.

308. The access node 120 receives the offer message addressed to the client device 110. The access node 120 configures a service according to the information regarding the bandwidth policy of the service configuration comprised in the offer message. The access node 120 removes information regarding the bandwidth policy of the service configuration from the offer message.

According to some embodiments the access node 120 comprises an SM agent which may perform processing.

The SM agent may intercept the DHCP messages and may perform processing, such as e.g. snooping and/or configuring of the bandwidth policy of the service configuration. This enables the access node 120 to enforce the bandwidth policy of the service configuration at the access node 120. Thus, the access node 120 may configure a service according to the bandwidth policy of the service configuration.

The SM agent may remove the DHCP option 82 or the new option comprising the bandwidth policy information from the offer message addressed to the client device 110.

309. The access node 110 forwards the offer message, which offer message is addressed to the client device 110, to the client device 110.

310. The client device 110 receives the offer message. Furthermore, the client device 110 selects and accepts the offer that was comprised in the received offer message. The offer message comprised service specific QoS configuration information.

According to the embodiments wherein the client device 110 or the client interface comprises a SM client this step is performed by the SM client.

According to the embodiments wherein the SM client is a DHCP client then the DHCP client selects and accepts the offer message which may be a DHCP offer message.

311. The client device 110 sends a request message to the SM server 150. The request message comprises the IP address of the SM server 150, i.e. the IP address of the server that made the offer which was selected.

According to the embodiments wherein the client device 110 or client interface comprises a SM client then the SM client sends the request message to the SM server 150.

According to the embodiments wherein the SM client is a DHCP client then the DHCP client may send the request message which may be a DHCP Request message. Thus, the DHCP client sends the DHCP request message comprising the IP address of the DHCP server that made the offer.

312. The access node 120 receives and forwards the request message to the SM server 150.

According to some embodiments the access node 120 comprises an SM agent which may process the received request message.

The SM agent, such as e.g. a DHCP relay agent or a DHCP forwarding agent or a DHCP intermediate agent, may intercept the DHCP Request message. The DHCP relay agent may perform processing to be adapted to forward the message as a direct addressed DHCP Request message to the SM server 150.

313. The intermediate node 130, 140 receives and forwards the request message to the SM server 150.

According to some embodiments the intermediate node 130, 140 comprises an SM agent which may process the received request message.

The SM agent, such as e.g. a DHCP relay agent or a DHCP forwarding agent or a DHCP intermediate agent, may intercept the DHCP Request message and add additional options such as Relay Agent Information Option (option 82) or the similar. The DHCP relay agent may perform processing to be adapted to forward the message as a direct addressed DHCP Request message to the SM server 150.

314. Upon receipt of the request message originating from the client device 110 the SM server 150 makes a final binding of the requested offered service configuration for the client device 110. The requested offered service configuration comprises the service specific QoS configuration information.

According to the embodiments wherein the SM server 150 is a DHCP server, the DHCP server makes the final binding of the requested offered service specific QoS service configuration for the SM client such as the DHCP client, of the client device 110. At this point, the IP and network QoS configuration process is complete. When the SM server 150 provides the service configuration, such as e.g. an IP address, to the client device 110 the SM server 150 also provides the bandwidth policy of the service configuration to the intermediate node 130, 140 and access node 120.

315. The SM server 150 sends an acknowledgement message comprising the information regarding the final bounded service configuration across the data network 100 to the client device 110.

According to the embodiments wherein the SM server 150 is a DHCP server then the acknowledgement message sent to the DHCP client may be a DHCP Acknowledgement message packet.

316. The intermediate node 130, 140 receives and forwards the received acknowledgement message addressed to the client device 110.

According to some embodiments the intermediate node, such as the switch 130 or the router 140, comprises an SM agent which may perform processing.

The SM agent, such as e.g. a DHCP relay agent or a DHCP forwarding agent or a DHCP intermediate agent, may intercept the DHCP messages and may perform processing, such as e.g. snooping and/or configuring/registering of the acknowledged service specific QoS service. This enables the intermediate node, such as the switch 130 or the router 140, to check that the service to be configured when performed is performed according to the acknowledged QoS. If not, i.e. the received data traffic from the client device 110 is of a QoS configuration other than the previously acknowledged, the intermediate node may adjust the service configuration to the acknowledged service specific QoS configuration.

317. The access node 120 receives and forwards the received acknowledgement message addressed comprising the information regarding the final bounded service configuration to the client device 110.

According to some embodiments the access node 120 comprises an SM agent which may perform processing.

The SM agent, such as e.g. a DHCP relay agent or a DHCP forwarding agent or a DHCP intermediate agent, may intercept the DHCP messages and may perform processing, such as e.g. snooping and/or configuring/registering of the acknowledged service specific QoS service. This enables the access node 120 to check that the service to be configured when performed is performed according to the acknowledged QoS. If not, i.e. the received data traffic from the client device 110 is of a QoS configuration other than the previously acknowledged, the access node may adjust the service configuration to the acknowledged service specific QoS configuration.

318. The client device 110 performs the service configuration according to the service configuration information in the received acknowledgement message.

Figure 4:
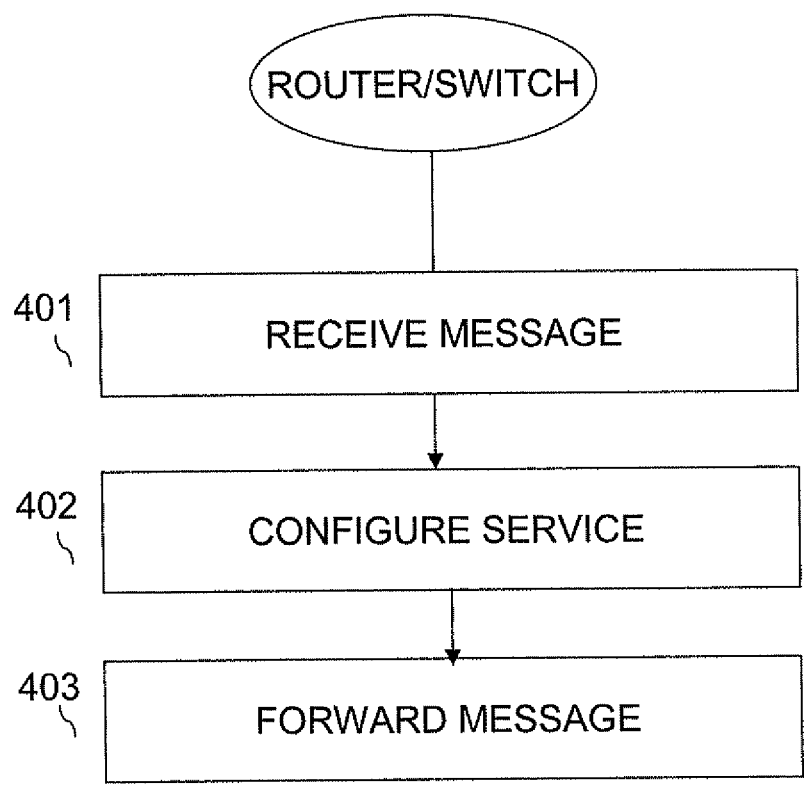
FIGS. 4, 5 and 6 are flowcharts of the methods according to embodiments of the present invention.

FIG. 4 presents the method steps, performed by an intermediate node such as an aggregation switch 130 and an edge router 140, for establishing a service specific bandwidth policy configuration, according to embodiments of the present invention. The intermediate node 130, 140 is comprised in a data network 100. The intermediate node 130, 140 is connected to a SM server 150 and an access node 120 comprised in the data network 100. The intermediate node is connected to the client device 110 via the access node 120. According to some embodiments the intermediate node 130, 140 may comprise a SM client which may perform the method steps according to any of the method steps 401-403. According to some embodiments may any of the method steps 401-403 be performed by means of DHCP signalling.

The method comprises the following steps:

401. The intermediate node 130, 140 receives a message addressed to the client device 110 from the SM server 150. The message comprises a service configuration for the client device 110. The message comprises information regarding the bandwidth policy of the service configuration.

402. In this step the intermediate node 130, 140 configures a service according to the information regarding the bandwidth policy of the service configuration. In one embodiment of the present invention the configuring of a service is performed in the final phase 209-218 of the service configuration process 201-218, as shown in FIG. 2. In another embodiment of the present invention the configuring of a service is performed in the preliminary phase 301-310 of the service configuration process 301-318, as shown in FIG. 3.

403. The intermediate node 130, 140 forwards the received message to the client device 110. The message comprises the service configuration and information regarding the bandwidth policy of the service configuration.

Figure 5:
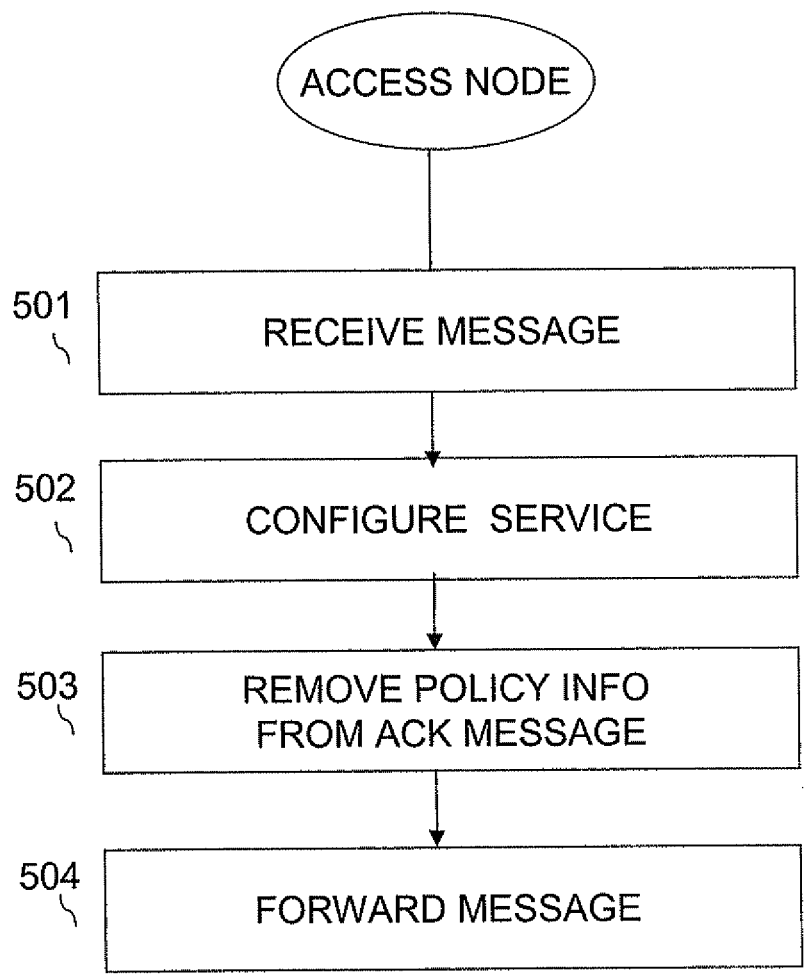

FIG. 5 presents the method steps, performed by an access node 120, for establishing a service specific bandwidth policy configuration, according to embodiments of the present invention. The access node 120 is comprised in a data network 100. The access node 120 is adapted to be connected to a SM server 150 and an intermediate node 130, 140 comprised in the data network 100 and to a client device 110. According to some embodiments the access node 120 may comprise a SM client which may perform the method steps according to any of the method steps 501-504. According to some embodiments may any of the method steps 501-504 be performed by means of DHCP signalling.

The method comprises the following steps:

501. The access node 120 receives a message addressed to the client device 110 from the SM server 150. The message comprises a service configuration for the client device 110. In addition, the message comprises information regarding the bandwidth policy of the service configuration.
502. In this step the access node 120 configures a service according to the information regarding the bandwidth policy of the service configuration. In one embodiment of the present invention the configuring of a service is performed in the final phase 209-218 of the service configuration process 201-218, as shown in FIG. 2. In another embodiment of the present invention the configuring of a service is performed in the preliminary phase 301-310 of the service configuration process 301-318, as shown in FIG. 3.
503. The access node 120 removes the information regarding the bandwidth policy of the service configuration from the received message addressed to the client device 110. In one embodiment of the present invention this step of the method is performed in the final phase 209-218 of the service configuration process 201-218, as shown in FIG. 2. In another embodiment of the present invention this step of the method is performed in the preliminary phase 301-310 of the service configuration process 301-318, as shown in FIG. 3.
504. The access node 120 forwards the received message to the client device 110. The message comprises the service configuration.

Figure 6:
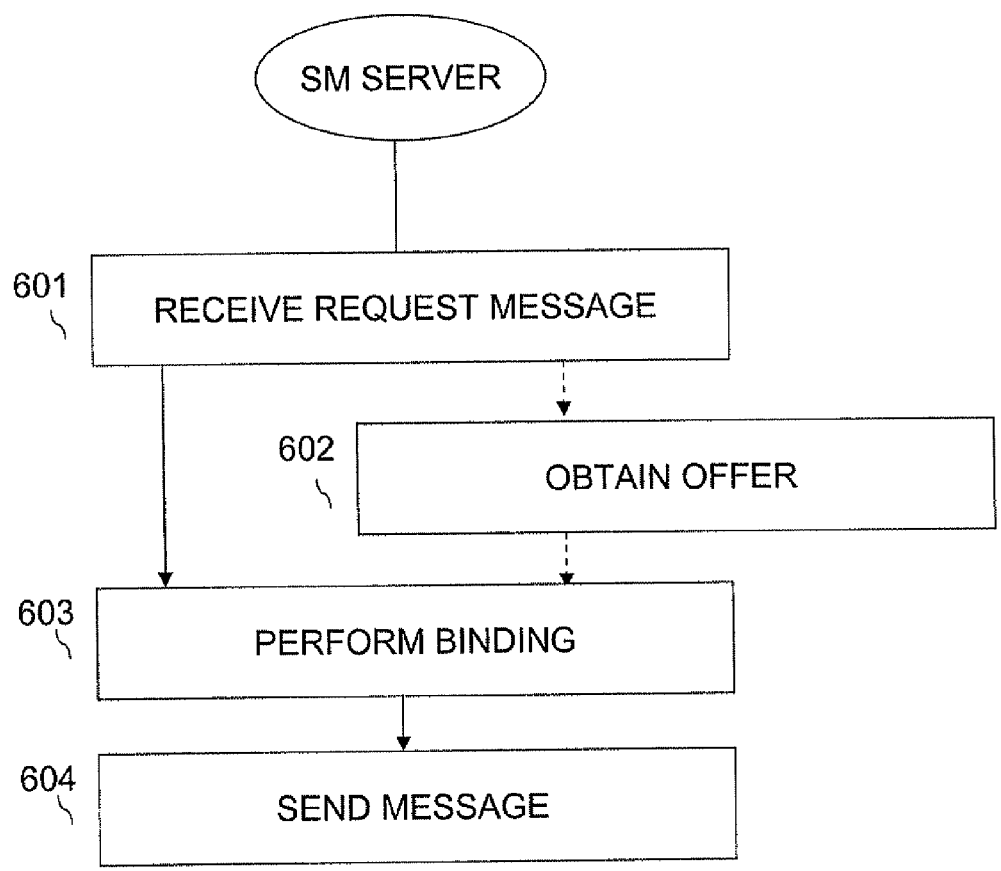

FIG. 6 presents the method steps, performed by a SM server 150, for establishing a service specific bandwidth policy configuration, according to embodiments of the present invention. The SM server 150 is arranged to be comprised in a data network 100. The data network 100 further comprises an intermediate node 130, 140 and an access node 120. The SM server 150 is adapted to be connected to a client device 110. According to some embodiments may any of the method steps 601-604 be performed by means of DHCP signalling.

The method comprises the following method steps:

601. The SM server 150 receives a request message from the client device 110. The request message may comprise a service configuration request.

According to another embodiment of the present invention this step of the method is performed in the preliminary phase 301-310 of the service configuration process 301-318, as shown in FIG. 3. In this embodiment the message is an offer request message.

602. According to one embodiment of the present invention this step of the method is performed in the preliminary phase 301-310 of the service configuration process 301-318, as shown in FIG. 3. In this embodiment the SM server 150 obtains an offer for a service configuration for the requested service configuration.
603. The SM server 150 performs a binding of the requested service configuration for a client device 110. The binding comprises the setting of a bandwidth policy of the service configuration.

According to one embodiment of the present invention this step of the method is performed in the final phase 209-218 of the service configuration process 201-218, as shown in FIG. 2. In this embodiment the binding is a final binding of the requested service configuration.

According to another embodiment of the present invention this step of the method is performed in the preliminary phase 301-310 of the service configuration process 301-318, as shown in FIG. 3. In this embodiment the binding is a preliminary binding of the requested service configuration.

604. In this step the SM server 150 sends a message addressed to the client device 110. The message comprises information regarding the bounded service configuration and information regarding the bandwidth policy of the bounded service configuration.

According to one embodiment of the present invention this step of the method is performed in the final phase 209-218 of the service configuration process 201-218, as shown in FIG. 2. In this embodiment the message addressed to the client device 110 is an acknowledgement message.

According to another embodiment of the present invention this step of the method is performed in the preliminary phase 301-310 of the service configuration process 301-318, as shown in FIG. 3. In this embodiment the message addressed to the client device 110 is an offer message.

Figure 7:
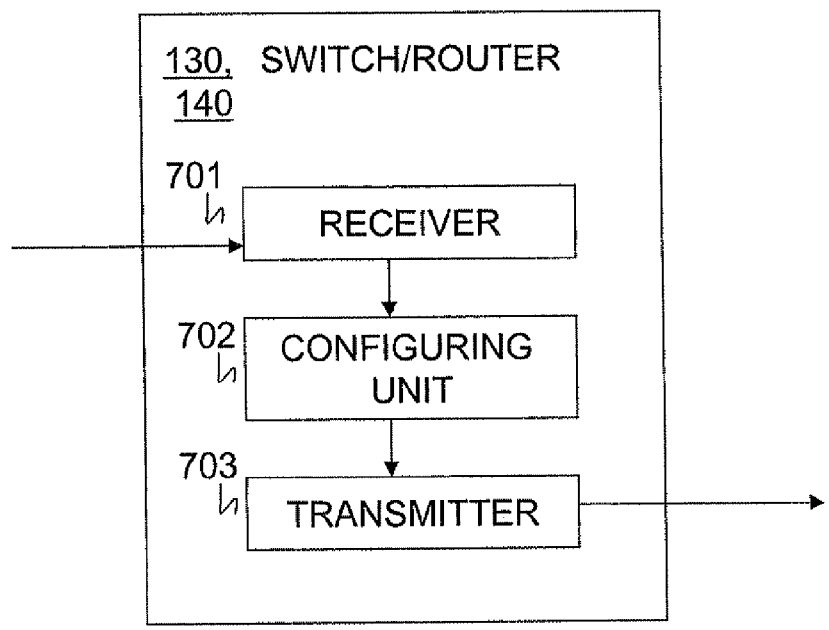
FIGS. 7, 8 and 9 are schematic block diagrams illustration nodes according to embodiments of the present invention in a data network.

To perform the method steps 401-403 in the intermediate node 130, 140 for establishing a service specific bandwidth policy configuration, according to an alternative of some of the embodiments, the intermediate node 130, 140 is arranged as illustrated in FIG. 7. The intermediate node 130, 140 is arranged to be comprised in the data network 100. The data network 100 comprises a service management server 150 and an access node 120. The intermediate node is adapted to be connected to a client device 110. The intermediate node 130, 140 comprises a receiver 701 adapted to receive a message addressed to the client device from the service management server. The message comprises a service configuration for the client device 110 and information regarding the bandwidth policy of the service configuration. The intermediate node 130, 140 further comprises a configuring unit 702 adapted to configure a service according to the information regarding the bandwidth policy of the service configuration. In addition, the intermediate node 130, 140 comprises a transmitter 703 adapted to forward the received message to the access node 120. In one embodiment the intermediate node is a switch 130, e.g. an aggregation switch. In another embodiment the intermediate node is a router 140, e.g. an edge router.

Figure 8:
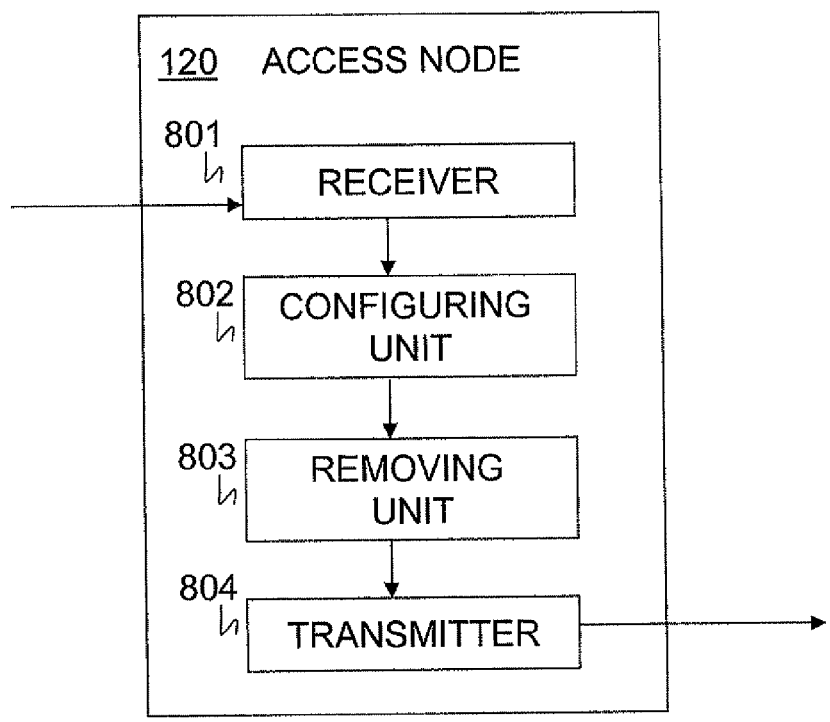

To perform the method steps 501-504 in the access node 120 for establishing a service specific bandwidth policy configuration, according to an alternative of some of the embodiments, the access node 120 is arranged as illustrated in FIG. 8. The access node 120 is arranged to be comprised in the data network 100. The data network 100 comprises a service management server 150 and an intermediate node 130, 140. The access node 120 is adapted to be connected to a client device 110. The access node 120 comprises a receiver 801 adapted to receive a message addressed to the client device from the service management server. The message comprises information regarding a service configuration for the client device 110 and information regarding bandwidth policy of the service configuration. The access node 120 further comprises a configuring unit 802 adapted to configure a service according to the information regarding the bandwidth policy of the service configuration. Additionally, the access node 120 comprises a removing unit 803 adapted to remove information regarding the bandwidth policy of the service configuration from the message. The access node further comprises a transmitter 804 adapted to forward the message to the client device 110.

Figure 9:
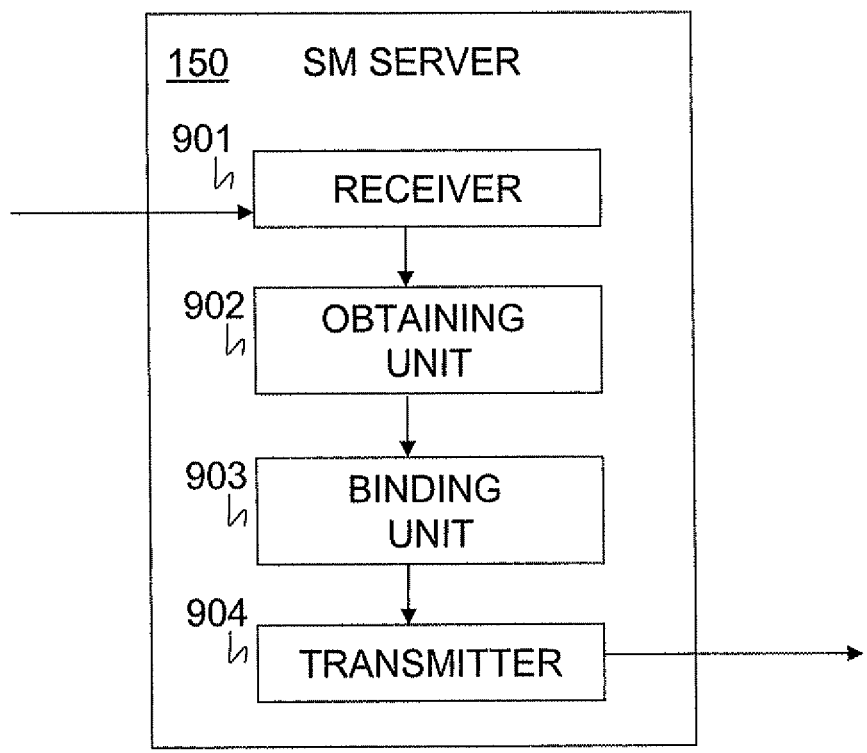

To perform the method steps 601-604 in the SM server 150 for establishing a service specific bandwidth policy configuration, according to an alternative of some of the embodiments, the SM server 150 is arranged as illustrated in FIG. 9. The SM server 150 is arranged to be comprised in the data network 100. The data network 100 comprises an access node 120 and an intermediate node 130, 140. The SM server 150 is adapted to be connected to a client device 110. The SM server 150 comprises a receiver 901 adapted to receive a request message from the client device 110. The request message comprises a service configuration request. The SM server further comprises a binding unit 903 adapted to perform a binding of the requested service configuration for a service management client in the client device 110. The binding comprises the setting of a bandwidth policy of the service configuration. Additionally, the SM server 150 comprises a transmitter 904 adapted to send a message addressed to the client device 110. The message comprises information regarding the bounded service configuration and information regarding the bandwidth policy of the bounded service configuration. In one embodiment of the present invention the SM server 150 comprises an obtaining unit 902 adapted to obtain an offer for a service configuration for the requested service configuration. The SM server 150 may be a DHCP server.

The present invention may, of course, be carried out in other ways than those specifically set forth herein without departing from essential characteristics of the invention. The present embodiments are to be considered in all respects as illustrative and not restrictive.

The invention claimed is:

1. A method for establishing a service specific bandwidth policy configuration, the method comprising:
an intermediate node receiving a dynamic host configuration protocol (DHCP) message addressed to a client device from a service management server, the DHCP message comprising an IP address offered to the client device and bandwidth policy information regarding a bandwidth policy of a service configuration, the bandwidth policy information comprising a quality of service (QoS) parameter;
the intermediate node obtaining the QoS parameter from the received DHCP message, enforcing the bandwidth policy using the obtained QoS parameter, and forwarding the received DHCP message to an access node, which is adapted to obtain the QoS parameter from the DHCP message, enforce the bandwidth policy using the obtained QoS parameter and forward the received DHCP message to the client device, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

2. The method according to claim 1, wherein the DHCP message is one of: a) a DHCP acknowledgment message, b) a DHCP request message, and c) a DHCP offer message.

3. The method according to claim 1, wherein the information regarding the bandwidth policy of the service configuration comprises information about at least one traffic class of the service configuration.

4. The method according to claim 3, wherein the information regarding the bandwidth policy of the service configuration comprises information about an amount of traffic allowed in the at least one traffic class of the service configuration.

5. The method according to claim 4, wherein the information regarding the bandwidth policy of the service configuration comprises information about the shaping or policing of the amount of traffic allowed in the at least one traffic class of the service configuration.

6. The method according to claim 4, wherein the information regarding the bandwidth policy of the service configuration comprises information about an asymmetric bandwidth policy of the amount of traffic allowed in the at least one traffic class of the service configuration.

7. The method according to claim 1, wherein the information regarding the bandwidth policy of the service configuration comprises information about a rate limiting hierarchy of several traffic classes of the service configuration.

8. The method according to claim 1, wherein the information regarding the bandwidth policy of the service configuration comprises information on whether the bandwidth policy is a dedicated policy or a shared policy.

9. The method according to claim 1, wherein the method steps are performed by means of Dynamic Host Control Protocol signaling.

10. An intermediate node for establishing a service specific bandwidth policy configuration, the intermediate node being adapted to be connected to: a service management server, an access node, and a client device, the intermediate node comprising:
a receiver for receiving a dynamic host configuration protocol (DHCP) message addressed to the client device from the service management server, the DHCP message comprising an IP address offered to the client device and bandwidth policy information regarding a bandwidth policy of a service configuration, the bandwidth policy information comprising a quality of service (QoS) parameter;
a transmitter; and
a processor programmed to: obtain the QoS parameter from the received DHCP message, enforce the bandwidth policy using the obtained QoS parameter, and employ the transmitter to forward the received DHCP message to the access node, which is adapted to obtain the QoS parameter from the DHCP message, enforce the bandwidth policy using the obtained QoS parameter and forward the received DHCP message to the client device, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

11. The intermediate node according to claim 10, wherein the intermediate node is a router or a switch.

12. A method for establishing a service specific bandwidth policy configuration, the method comprising:

an access node receiving, from an intermediate node, a dynamic host configuration protocol (DHCP) message addressed to a client device and transmitted by a service management server, the DHCP message comprising information regarding a service configuration for the client device and bandwidth policy information regarding a bandwidth policy of the service configuration, the intermediate node obtaining the QoS parameter from the received DHCP message and enforcing the bandwidth policy using the obtained QoS parameter;

the access node obtaining the bandwidth policy information from the received DHCP message;

the access node enforcing the bandwidth policy using the obtained bandwidth policy information;

the access node modifying the received DHCP message to generate a modified DHCP message, wherein modifying the DHCP message comprises removing the bandwidth policy information from the received DHCP message; and the access node forwarding the modified DHCP message to the client device, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

13. The method according to claim 12, wherein the DHCP message is one of: a) a dynamic host configuration protocol (DHCP) acknowledgement message, b) a DHCP request message, and c) a DHCP offer message.

14. The method according to claim 12, wherein the information regarding the bandwidth policy of the service configuration comprises information about at least one traffic class of the service configuration.

15. The method according to claim 14, wherein the information regarding the bandwidth policy of the service configuration comprises information about an amount of traffic allowed in the at least one traffic class of the service configuration.

16. The method according to claim 15, wherein the information regarding the bandwidth policy of the service configuration comprises information about the shaping or policing of the amount of traffic allowed in the at least one traffic class of the service configuration.

17. The method according to claim 15, wherein the information regarding the bandwidth policy of the service configuration comprises information about an asymmetric bandwidth policy of the amount of traffic allowed in the at least one traffic class of the service configuration.

18. The method according to claim 12, wherein the information regarding the bandwidth policy of the service configuration comprises information about a rate limiting hierarchy of several traffic classes of the service configuration.

19. The method according to claim 12, wherein the information regarding the bandwidth policy of the service configuration comprises information on whether the bandwidth policy is a dedicated policy or a shared policy.

20. The method according to claim 12, wherein the method steps are performed by means of Dynamic Host Control Protocol signaling.

21. An access node for establishing a service specific bandwidth policy configuration, the access node being adapted to be connected to: a service management server, an intermediate node, and a client device, the access node comprising:

a receiver for receiving, from an intermediate node, a dynamic host configuration protocol (DHCP) message addressed to the client device from the service management server, the DHCP message comprising bandwidth policy information regarding a bandwidth policy of a service configuration being offered to the client device, the intermediate node obtaining the QoS parameter from the received DHCP message and enforcing the bandwidth policy using the obtained QoS parameter;

a transmitter; and a processor programmed to: obtain the bandwidth policy information from a received DHCP message, enforce the bandwidth policy using the obtained bandwidth policy information, remove the bandwidth policy information from the received DHCP message, thereby generating a modified DHCP message, and employ the transmitter to forward the modified DHCP message to the client device, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

22. A method for establishing service specific bandwidth policy configuration, the method comprising: a service management server receiving an IP address request message from a client device, the request message comprising an IP address request;

the service management server performing a binding of an IP address to be offered to the client device with the client device, said binding comprising a setting of a bandwidth policy; and the service management server sending a dynamic host configuration protocol (DHCP) message addressed to the client device through an intermediate node and an access node, the DHCP message comprising the IP address to be offered to the client device and bandwidth policy information regarding the bandwidth policy, the bandwidth policy information comprising a QoS parameter for use in enforcing the bandwidth policy, wherein both the intermediate node and the access node through which the DHCP message is sent are adapted to obtain the QoS parameter from the DHCP message and enforce the bandwidth policy using the obtained QoS parameter, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

23. The method according to claim 22, wherein the DHCP message addressed to the client device is a DHCP acknowledgement message, and wherein the binding is a final binding of the requested service configuration.

24. The method according to claim 22, wherein the request message from the client device is an offer request message, the message addressed to the client device is a DHCP offer message, and the method further comprises the step of:

obtaining an offer for a service configuration for the requested service configuration, and wherein the binding is a preliminary binding of the obtained offer.

25. The method according to claim 22, wherein the information regarding the bandwidth policy of the service configuration comprises information about at least one traffic class of the service configuration.

26. The method according to claim 25, wherein the information regarding the bandwidth policy of the service configuration comprises information about an amount of traffic allowed in the at least one traffic class of the service configuration.

27. The method according to claim 26, wherein the information regarding the bandwidth policy of the service configuration comprises information about the shaping or policing of the amount of traffic allowed in the at least one traffic class of the service configuration.

28. The method according to claim 26, wherein the information regarding the bandwidth policy of the service configuration comprises information about an asymmetric bandwidth policy of the amount of traffic allowed in the at least one traffic class of the service configuration.

29. The method according to claim 22, wherein the information regarding the bandwidth policy of the service configuration comprises information about a rate limiting hierarchy of several traffic classes of the service configuration.

30. The method according to claim 22, wherein the information regarding the bandwidth policy of the service configuration comprises information on whether the bandwidth policy is a dedicated policy or a shared policy.

31. The method according to claim 22, wherein the method steps are performed by means of Dynamic Host Control Protocol signaling.

32. A service management server for establishing service specific bandwidth policy configuration, the service management server being adapted to be connected to an access node, an intermediate node, and a client device, the service management server comprising:
   a receiver for receiving an IP address request message from the client device, the request message comprising an IP address request;
   a transmitter; and
   a processor programmed to: a) perform a binding of an IP address to be offered to the client device with the client device, said binding comprising the setting of a bandwidth policy,
   b) employ the transmitter to send a dynamic host configuration protocol (DHCP) message addressed to the client device through the intermediate node and the access node, the DHCP message comprising the IP address to be offered to the client device, bandwidth policy information regarding the bandwidth policy, wherein the bandwidth policy information comprises a QoS parameter for use in enforcing the bandwidth policy, and wherein both the intermediate node and the access node through which the DHCP message is sent are adapted to obtain the QoS parameter from the DHCP message and enforce the bandwidth policy using the obtained QoS parameter, wherein the access node is a digital subscriber line access multiplexer (DSLAM) or a passive optical networks optical line termination (PON-OLT), and wherein the intermediate node is an Ethernet switch adapted to switch data packets within the data network or a Multi Service Edge Router (MSER) adapted to route data packets between the data network and an external network.

33. The service management server according to claim 32, wherein the DHCP message addressed to the client device is one of: a) a DHCP acknowledgement message and b) a DHCP offer message.

34. The service management server according to claim 32, wherein the request message from the client device is an offer request message, and
   wherein the processor is further programmed to obtain an offer for a service configuration for the requested service configuration; and wherein the binding is a preliminary binding of the obtained offer.

35. The service management server according to claim 32, wherein the service management server is a Dynamic Host Control Protocol server.

36. The method of claim 12, wherein the access node receives the DHCP message from the service management server through the intermediate node, and wherein the intermediate node from which the DHCP message is received is also adapted to configure the service according to the information regarding the bandwidth policy of the service configuration.

37. The method of claim 1, wherein the access node is further adapted to: a) modify the received DHCP message to generate a modified DHCP message by removing the bandwidth policy information from the received DHCP message and b) forward the modified DHCP message to the client device.

38. The method of claim 22, wherein the access node is further adapted to: a) modify the received DHCP message to generate a modified DHCP message by removing the bandwidth policy information from the received DHCP message and b) forward the modified DHCP message to the client device.

* * * * *